United States Patent
Schubert

(10) Patent No.: US 8,296,823 B2
(45) Date of Patent: Oct. 23, 2012

(54) SYSTEM, AN ARRANGEMENT AND A METHOD FOR END USER AUTHENTICATION

(76) Inventor: Ulf Schubert, Sollentuna (SE)

( * ) Notice: Subject to any disclaimer, the term of this patent is extended or adjusted under 35 U.S.C. 154(b) by 854 days.

(21) Appl. No.: 12/278,152

(22) PCT Filed: Feb. 3, 2006

(86) PCT No.: PCT/SE2006/000157
§ 371 (c)(1), (2), (4) Date: Aug. 20, 2008

(87) PCT Pub. No.: WO2007/089179
PCT Pub. Date: Aug. 9, 2007

(65) Prior Publication Data
US 2009/0119754 A1 May 7, 2009

(51) Int. Cl.
*H04L 29/06* (2006.01)
(52) U.S. Cl. .......... 726/3
(58) Field of Classification Search .......... None
See application file for complete search history.

(56) References Cited

U.S. PATENT DOCUMENTS

| | | | |
|---|---|---|---|
| 2003/0051041 A1* | 3/2003 | Kalavade et al. | 709/229 |
| 2003/0191939 A1* | 10/2003 | Tsai et al. | 713/168 |
| 2003/0204726 A1* | 10/2003 | Kefford et al. | 713/171 |
| 2005/0195778 A1* | 9/2005 | Bergs et al. | 370/338 |
| 2006/0094403 A1* | 5/2006 | Norefors et al. | 455/411 |

\* cited by examiner

*Primary Examiner* — Gilberto Barron, Jr.
*Assistant Examiner* — Shaun Gregory
(74) *Attorney, Agent, or Firm* — Potomac Patent Group PLLC

(57) ABSTRACT

The present invention relates to a system for authentication of an end user of a user station arrangement (10) requesting access to protected information, comprising access server means (20) and authentication means (30), the user station arrangement (10) supporting communication with the authentication means (30) over a first communication channel of a radio network (40). It further supports communication with the authentication means (30) over a second communication channel. The authentication means (30) are adapted to, at reception of a request for access to protected information from a user station arrangement (10), establish if the user station arrangement (10) is reachable over the first communication channel. Said authentication means (30) are adapted to support a first authentication mode and a second authentication mode over said second communication channel, and further comprises decision means for selecting if and/or when the first or second authentication mode is to be used for a user station arrangement (10) requesting access to protected information.

23 Claims, 8 Drawing Sheets

SYSTEM, AN ARRANGEMENT AND A METHOD FOR END USER AUTHENTICATION

FIELD OF THE INVENTION

The present invention relates to a system for authentication of an end user of a user station arrangement requesting access to protected information, for example a protected resource or a protected service or similar, which comprises access server means and authentication means, wherein the mobile user station arrangement supports communication with the authentication means over a first communication channel of a radio network.

The invention also relates to an authentication means for authentication of an end user requesting access to protected information, a protected resource or a protected service, from a user station arrangement comprising an access serving means interface, at least one interface enabling communication with the user station arrangement over a first communication channel of a radio network.

The invention also relates to a method for authentication of a remote end user of a user station arrangement requesting access to a protected service, resource, information etc. by sending an access request to an authentication means. Particularly it relates to authentication of mobile users requesting access to protected resources via an IP network or other form of electronic access network.

STATE OF THE ART

Remote access to services which are protected, or protected sensitive information in general, via public networks requires strong authentication of the end user to avoid abuse of the protected information or to prevent that the protected information or services are spread unintentionally. Traditionally authentication is provided with so-called authentication tokens provided to the end users. It is then verified if the end user is in possession of the token before access to the protected service or information is granted. A typical example thereof is a so called token card, which provides the end user with pseudo-random one-time passwords to be verified by an authentication server.

As an alternative to the deployment of separate authentication tokens, the identity module of a mobile device, for example a GSM SIM (Subscriber Identity Module) card or an UMTS (Universal Mobile Telecommunication System) USIM (UMTS SIM) can be utilised as a token. The identity module may contain a private secret key which can be used for signing an authentication challenge and to prove that the remote end user is in possession of the security token, which in such implementations consists of the identity module of the mobile device.

Today there are two main approaches for utilising the identity module of mobile devices as a security token. One of the approaches consists in utilising the mobile network as a security channel, whereby the authentication server communicates with the mobile device via the radio network, which in the following will be denoted network-based authentication. Network-based authentication provides superior ease-of-use, since the authentication server automatically can carry out several steps in the authentication dialogue with only minimum input from the end user. It is however a disadvantage with such network-based authentication methods that the mobile device has to be within radio coverage for the authentication to work. Another disadvantage is that the channel simply can be blocked, thus preventing authentication to be performed.

Another approach is based on requesting the end user to manually perform a signature operation on the mobile device, which here is denoted authentication with manual input.

Authentication with manual input requires considerable interaction with the end user, the end user e.g. has to read a challenge from the access channel, input this on the mobile device, and return a signed response every time. This becomes particularly inconvenient if the mobile device simultaneously is used as an access terminal. Such an approach is however not dependent on radio coverage.

U.S. Pat. No. 5,668,876 describes a method and an apparatus for authentication of an end user attempting to access an electronic service whereby a challenge code is sent to a personal unit such as a mobile phone to be used with a standard telephone, a mobile telephone or a wired telephone. A challenge code is transmitted to the personal unit, the user puts in a PIN or similar, the unit generates a response code based on an internally stored secret key. This code is input on e.g. a telephone, sent back for comparing the response with the original challenge code or with an expected response code to allow or reject access. This document particularly solves the problem of requiring dedicated terminals or customized terminals restricting the use of security systems to specific sites. However, this solution is disadvantageous in that it does not follow up the outcome of the delivery of challenge codes, which among others means that if there is no radio coverage, the authentication will fail.

SUMMARY OF THE INVENTION

What is needed is therefore a system through which end user authentication can be performed in an easy and flexible way, particularly requiring as little end user interaction as possible. Particularly a system is needed which is not restricted to the use of any dedicated units. Still further a system is needed which can take advantage of a so called network-based approach without suffering from the drawbacks normally associated therewith. Particularly a system is needed which operates irrespectively of whether the user station arrangement is reachable or not, i.e. within coverage of a radio network, which in addition thereto is user-friendly, and to a desired or maximum extent can be automated. Particularly a system is needed which is easy to implement in already existing communication systems as well as to implement in new systems.

An arrangement, or an authentication means, is also needed through which one or more of the above mentioned objects can be achieved. Still further a method is needed through which one or more of the above mentioned objects can be achieved.

Therefore a system as initially referred to is provided wherein the user station arrangement further supports communication with the authentication means over a second communication channel. The authentication means are adapted to, at reception of a request for access to protected information or to a protected service or protected resource, from a user station arrangement, establish if the user station arrangement is reachable over the first communication channel for authentication purposes and further to support a first authentication mode as well as a second authentication mode over said second communication channel. The authentication means further comprises decision means for selecting if, and/or when, the first or second authentication mode is to be activated or used for a user station arrangement requesting access to protected information etc. Said decision means particularly comprises or communicates with switching means for switching between the first and the second authentication mode depending on which thereof can or should be used. Most particularly the first authentication mode has priority over the second authentication mode, which means that if the first authentication mode can be used, it should be used. The authentication means particularly comprises examination means which comprises or includes said decision means for establishing if the user station arrangement is reachable for authentication purposes over the first communication channel or not. Particularly the first communication channel comprises an authentication channel and, even more particularly, the second communication channel comprises an access channel.

In one implementation the second communication channel is a communication channel of, also, the first radio network, or, in another embodiment, of a second radio network. In another advantageous embodiment, however, the second communication channel is a communication channel of a fixed communication network, or a wired communication network, e.g. for Internet access or supporting Internet access.

In one implementation the authentication means comprises an authentication module, which may be provided in or associated with an authentication server. It may also be provided in or associated with an access means. In other implementations the authentication means comprises an authentication server.

In some embodiments the user station arrangement comprises a mobile device and an access terminal forming separate units. In alternative implementations the user station arrangement comprises a mobile access terminal as a single unit, i.e. the mobile device and the access terminal are provided as a single unit.

The decision means as referred to above are particularly adapted to select the second mode if the user station arrangement either as a combined unit or the mobile device thereof, is not reachable over said first radio network, for example if it is out of radio coverage or if the first communication channel is blocked etc. There may of course also be other reasons for utilising the second communication channel, particularly the access channel instead, or the second mode instead.

The authentication means particularly comprises authentication executing means comprising said examination means and which are adapted to initiate a pre-authentication dialogue with the user station arrangement over the first communication channel, for example over the first radio network, to establish if the first authentication mode can be used, or if the user station arrangement is reachable over the first radio network.

Even more particularly said authentication means are adapted to, for performing said pre-authentication dialogue which also can be said to constitute an examination step, generate and transmit a first challenge message comprising a challenge code to the user station arrangement over the first communication network, and to initiate a first authentication dialogue of the first authentication mode by providing a second challenge message comprising a challenge prompt to the user station arrangement if the delivery of the challenge code of the first challenge message is verified. The authentication means are further adapted to, if delivery of the challenge code is not verified, initiate a second authentication dialogue of the second authentication mode by generating and sending a combined challenge message comprising a challenge code and a challenge prompt in the same message over the second communication channel to the user station arrangement, and to examine if the challenge code is returned appropriately signed and corresponds to the sent challenge code, or an expected response to the sent challenge code, for granting access or rejecting access, to the protected information/service depending on the outcome of the examination. The examination and grant/reject procedure is the same irrespectively of whether the first or second mode is used.

In a particular embodiment the examination means are adapted to send said first challenge message as an SMS (Short Message Service) over for example an SMS-C (SMS-Center). Most particularly the challenge code comprises a random number, generated in any appropriate manner.

The authentication means further comprises or communicates with user data storing means holding user information such as public keys for user station arrangements and authentication verification means adapted to decrypt returned signed (encrypted) challenge codes using the public key of a user station arrangement corresponding to a respective private key stored in an authentication module of the respective user station arrangement, and by comparing the returned decrypted challenge code with the original challenge code sent to the user station arrangement or an expected response, and to, if the decrypted, returned challenge code corresponds to the original challenge code or the expected response, grant the access request, otherwise to reject the access request.

Most particularly a RADIUS challenge—response mechanism or similar is supported by the system.

In one embodiment the second challenge message, e.g. the challenge prompt of the first mode, is sent via the second communication channel, the challenge code being signed (automatically) in the mobile device and presented on the mobile device, prompting the end user to enter the signed challenge code on the access client. Alternatively, the signing with the private key is to be performed manually or includes a manual signing as well. Alternatively it can be provided for automated entry of the signed challenge code for example if the user station is a combined user station arrangement (one entity) as discussed above or if the access terminal (client) and the mobile device are separate units but connected for example by means of a Bluetooth protocol or similar.

If the second mode is, or has to be, implemented the access code is instead sent over the second communication channel, with the prompt, to the access terminal and the end user is prompted to sign the challenge code with the mobile device by manually selecting a signature function on the mobile device, entering the challenge code (presented on the access terminal) thereon and then enter the signed challenge code (presented on the mobile device) on the access terminal. Also here, for a combined user station assignment partial or complete automation is possible.

According to the invention an authentication means as initially referred to is therefore also suggested which is adapted to support communication with the user station arrangement also over a second communication channel, which further comprises an authentication execution means comprising examination means for establishing if a protected access requesting user station arrangement is reachable over the first communication channel for authentication purposes. Said authentication means are adapted to support a first authentication mode and a second authentication mode (only) using the second communication channel, said examination means comprising decision means for selecting said first or said second authentication mode. Said decision means particularly comprises or communicates with switching means for switching between the first and the second authentication mode. Most particularly the first authentication mode has priority over the second authentication mode, said second mode particularly only being used if the user station arrangement is not reachable over the first communication channel for authentication purposes. In a particular implementation the first communication channel comprises an authentication channel and the second communication channel comprises an access channel. Most particularly the first communication channel is a radio network communication channel of a first radio network whereas the second communication channel is a communication channel of a fixed communication network, e.g. for Internet access, or a radio network communication channel of said first radio network in addition to the first one or of a second radio network. In one implementation the authentication means comprises an authentication server. Alternatively it comprises an authentication module adapted to be associated with or provided in an authentication server or an access server, or a combined authentication-access server, or through its inclusion or association forming a combined access-authentication server.

Most particularly the examination means are adapted to examine if a given criterium is fulfilled to establish if the user station arrangement is reachable over the first communication channel, most particularly by sending a challenge code over the first communication channel, e.g. as an SMS, and to examine if a direct or indirect delivery confirmation is obtained from the user station arrangement or the radio network side relating to the availability over the user station arrangement. Most particularly, if the given criterium is fulfilled, the examination means are adapted to activate the authentication execution means in the first mode in which they are adapted to send a second challenge message comprising a challenge prompt for prompting an entry of the challenge code sent in the first challenge message, preferably automatically signed in the mobile device of the user station arrangement, (manually) on the access client and returning of said signed challenge code to the authentication means. Said authentication execution means further comprises verifying means for decrypting the signed challenge code and to compare the returned, decrypted challenge code with the originally sent challenge code (or an expected response) and to grant the access request if there is agreement between the original challenge code (expected response) and the decrypted, returned challenge code, and to otherwise reject the access request.

The verifying means are particularly adapted to, in the first as well as in the second mode, fetch a public key concerning the user station arrangement stored in external or internal storing means and corresponding to a private key of the user station arrangement used for signing. Even more particularly the authentication means are adapted to, if no delivery confirmation is received, or if the access request is rejected in implementation of the first mode, send a combined challenge message comprising both a challenge code and a challenge prompt to the user station arrangement for signing on the mobile device and entry on the access client, to decrypt the returned, signed challenge code and to compare the returned decrypted challenge code with the original sent challenge code (expected response) and to grant the access request if there is agreement between the original challenge code and the decrypted, returned challenge code, and to reject the access request otherwise. Particularly manual signing is requested on the mobile device after input of the challenge code presented on the access terminal, and manual entry thereof of the signed challenge code on the access client.

The first challenge message, for example the challenge code, particularly comprises a random challenge code.

In order to solve one or more of the above mentioned problems and to fulfil one or more of the objects discussed earlier in the application, a method as initially referred is also provided which comprises the steps of; performing an examination step in the authentication means to establish if the user station arrangement is reachable for authentication purposes over a first communication channel of a (first) radio network; if yes; initiating a first authentication mode; if not; initiating a second authentication mode over a second communication channel.

The examination step particularly comprises the steps of; generating a first challenge message at the authentication means; sending the first challenge message to the user station arrangement or a radio network node handling the user station arrangement; examining, in the authentication means, if a given criterium is fulfilled, e.g. if a delivery confirmation of the first message is received within a given time period; if yes; initiating said first authentication mode, by sending a second challenge message requesting the first challenge message signed at the user station arrangement in return, and if not; initiating said second mode; by generating a combined challenge message and sending said combined challenge message to the user station arrangement over a second communication channel. Most particularly the first challenge message comprises a challenge code, for example a random-code and the second challenge message comprises a challenge prompt whereas, the combined challenge message comprises a challenge code and a challenge prompt.

Even more particularly the first and the second authentication mode, i.e. irrespectively of which of them that is implemented, comprise the steps of, in the authentication means; reception of a returned signed or encrypted challenge code; decrypting the returned encrypted challenge code; comparing the originally sent challenge code or an expected response, with the returned, decrypted challenge code; granting the access request if the returned decrypted challenge code corresponds to the original sent challenge code or the expected response, otherwise rejecting the access request.

Most particularly the method comprises the steps of, at the user station arrangement; and for the first mode; automatically signing the challenge code sent as the first challenge message with a private key in the mobile device; presenting the signed challenge code on a display of the mobile device of the user station arrangement; sending a delivery confirmation to the authentication means; entering the signed challenge code on an access client of the user station arrangement at reception of the challenge prompt. The entry can be performed automatically if the user station arrangement for example comprises one single unit comprising a mobile device and an access terminal (client) or if there for example is provided for Bluetooth communication between them. Otherwise the entering is performed manually by the end user, or via IR-transfer.

Particularly the method comprises the steps of, at the user station arrangement; prompting, with the first challenge message, an end user to enter a secret user code, for example a PIN-code, on the mobile device of the user station arrangement; signing the challenge code with the private secret key stored on an identity module of the user station arrangement, for example a SIM-card; presenting the signed challenge code on the display of the mobile device of the user station arrangement; sending a delivery confirmation to the authentication means.

Particularly the method comprises the steps of, at reception of the delivery confirmation at the authentication means; sending the second challenge message or challenge prompt to the access client of the user station arrangement requesting the end user to enter the signed challenge code, presented on the mobile device display, on the access client; returning, from the access client, the signed challenge code to the authentication means.

Particularly the decryption step comprises; fetching a public key corresponding to the private key stored on an authentication module of the mobile device from a storing means; decrypting the signed challenge code with the public key. The storing means may be included in the authentication means or in the authentication module or authentication means or in external storing means communication with the authentication means.

Most particularly the method comprises the steps of; implementing the second authentication mode by; sending the generated combined access challenge to an access client of the user station arrangement instructing the end user to manually sign the challenge code on a mobile device of the user station arrangement, by requesting the end user to enter the challenge code on the mobile device, and optionally a user password, for example PIN; signing the challenge code with the private key stored in a security module of the mobile device; presenting the signed challenge code on the mobile device display; requesting the end user to enter the signed challenge code on the access client; returning the signed challenge code to the authentication means from the access client.

It is an advantage of the invention that two different authentication modes (channels) are available and that the radio network channel can be used if possible, otherwise the other channel, for example an access channel can be used. It is also an advantage that, particularly in case the radio channel is used, the procedure can be automated to a high extent, but also in the second mode it can automated to different extents, that authentication can be performed over a radio network, an authentication channel, to the highest possible extent, and only if this does not work the access channel is used. It is also advantageous that authentication can be provided irrespectively of whether there is radio coverage or if the user station arrangement is within radio coverage of the radio network or not, or of whether the radio channel is blocked etc.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
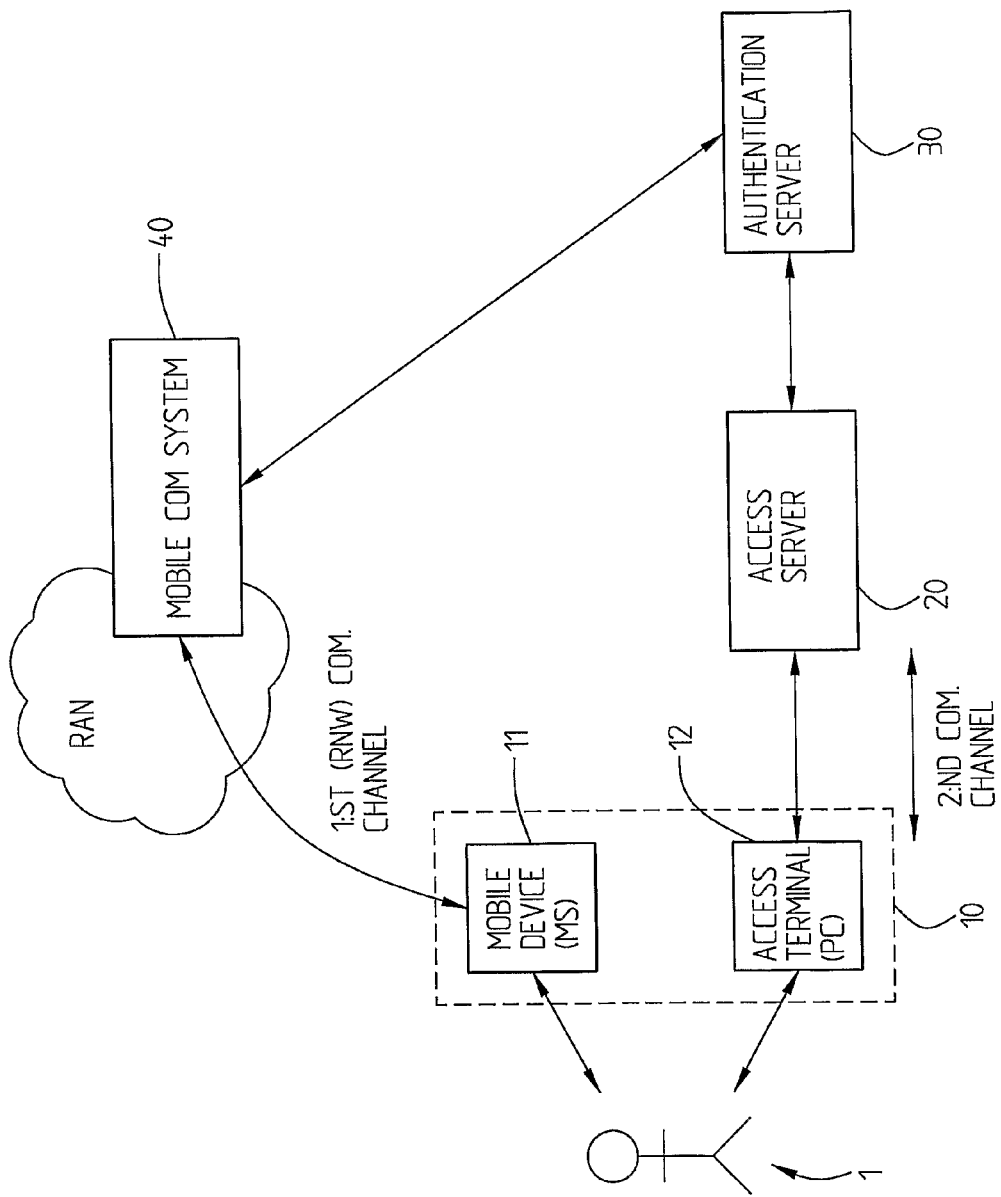
FIG. 1 schematically illustrates a system according to a first implementation of the inventive concept, FIG. 2 schematically illustrates a second implementation of a system according to the inventive concept, FIG. 3 schematically illustrates a third implementation of a system according to the inventive concept, FIG. 4 very schematically illustrates the means or the functional parts of the authentication means which are needed for carrying out the inventive concept.

FIG. 1 is a schematical block diagram showing one example of a system in which the inventive concept is implemented. Included in the system is a user station arrangement 10, here comprising a separate mobile device 11, for example a mobile telephone or a hand-held computer or similar, and an access terminal 12 which for example comprises a personal computer (PC) or a hand-held computer etc. The access terminal 12 communicates with an access server 20 over the second communication channel comprising an access channel, which is the channel over which the protected information or service or resource is to be reached. The access server 20 is in communication with an authentication server 30. The user station arrangement 10, here the mobile device 11, as referred to above typically a mobile telephone, but it can also be some other kind of mobile communication device, for example a hand-held or a laptop computer, is connected via a radio network (RAN, Radio Access Network) with of a mobile communication system 40, for example a mobile telephony system. The communication between the mobile device 11 and the mobile communication system 40 is provided over a first communication channel, a first radio network communication channel, here also referred to as an authentication channel. It is here supposed that an end user 1 tries to access the access server 20 via the access terminal 12. In order to be able to grant or reject access to protected information or a protected service, the access server 20 forwards an access request (from the access terminal or access client 12) to the authentication server 30 which is responsible for verifying the identity of the end user 1. In this particular embodiment this is done by utilising the security module in the mobile device 11 which is carried by the end user 1. Mobile device 11 should here normally be reached via radio network RAN and the mobile communication system 40. In this particular embodiment the mobile device 11 and the access terminal 12 of the user arrangement 10 are separate units. It should be clear that the user arrangement also may consist of one single device comprising both functionalities. In case the user arrangement 10 consists of one single unit, i.e. the mobile device 11 and the access terminal 12 are one and the same device, the radio network/telephony system 40 may also function as the access channel. The identity module and the mobile device 11 can typically be a GSM/3GSM SIM card or an UMTS USIM card or any other form of identity module, hardware or software. According to the inventive concept, for identification purposes, it is first established if the first authentication mode over the first communication channel can be used, i.e. if the mobile device 11 is reachable over the first communication channel or a radio network channel. If yes, the first authentication mode as will be further described below is used whereas if it can not be reached or is not reachable and able to provide a delivery receipt to the authentication server 30, a second authentication mode is initiated over the second communication channel. The second mode normally requires some more user interaction than the first authentication mode why the first authentication mode preferably is used whenever possible.

Figure 2:
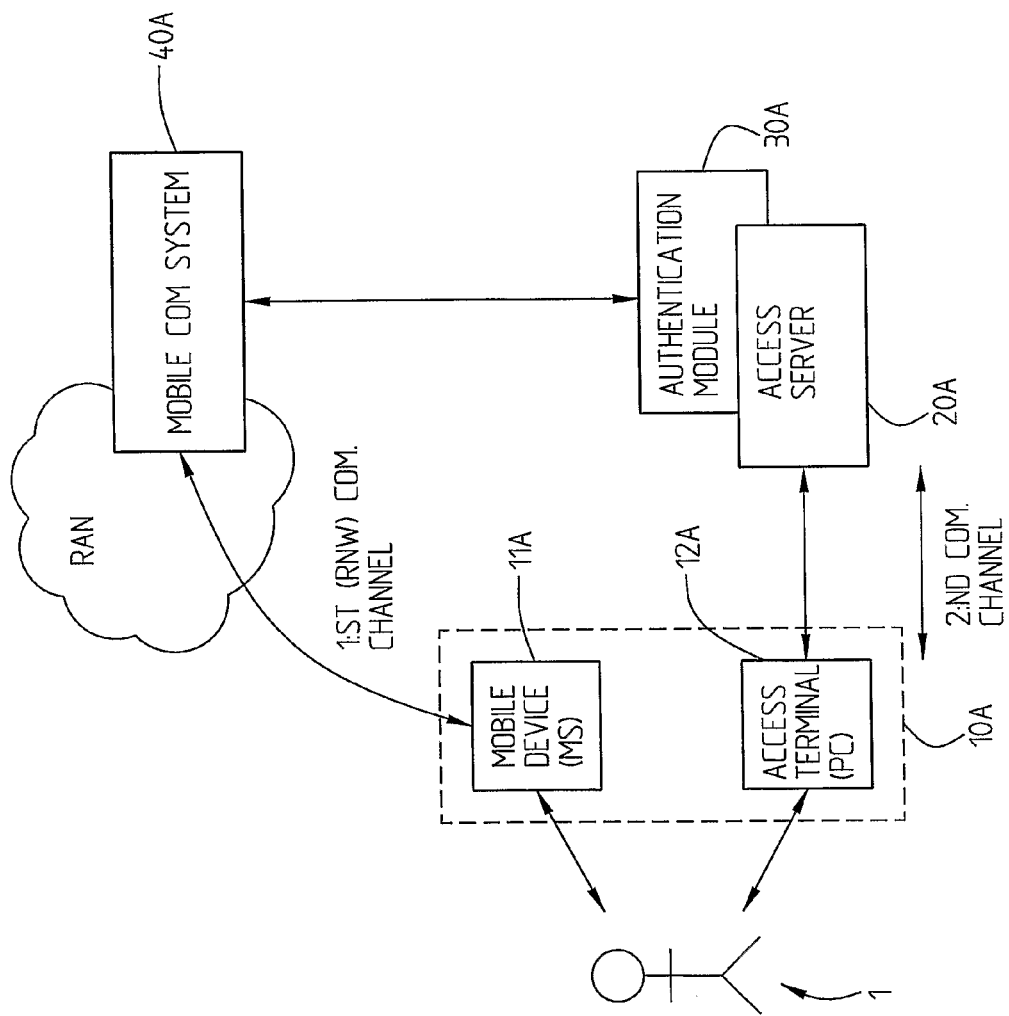

FIG. 2 is another block diagram describing an alternative implementation of a system according to invention. Also here the user station arrangement 10A is supposed to consist of a mobile device 11A and an access terminal 12A. It should however be clear that also in this embodiment it might comprise a single device as discussed above with reference to FIG. 1. The mobile device 12A is connected through a first communication channel of a radio network with the mobile communication system 40A and the access terminal 12A communicates over a second communication channel with an access server 20A. However in this embodiment it is supposed that the authentication means are implemented as an authentication module 30A which is provided in or an association with the access server 20A. In other aspects the functioning is similar to that described with reference to FIG. 1, the intention of FIG. 2 merely being to illustrate that the authentication means can be implemented as a separate authentication means or as an authentication server or as an authentication module provided in or association with an access server 20A (or in association with a conventional authentication server).

Figure 3:
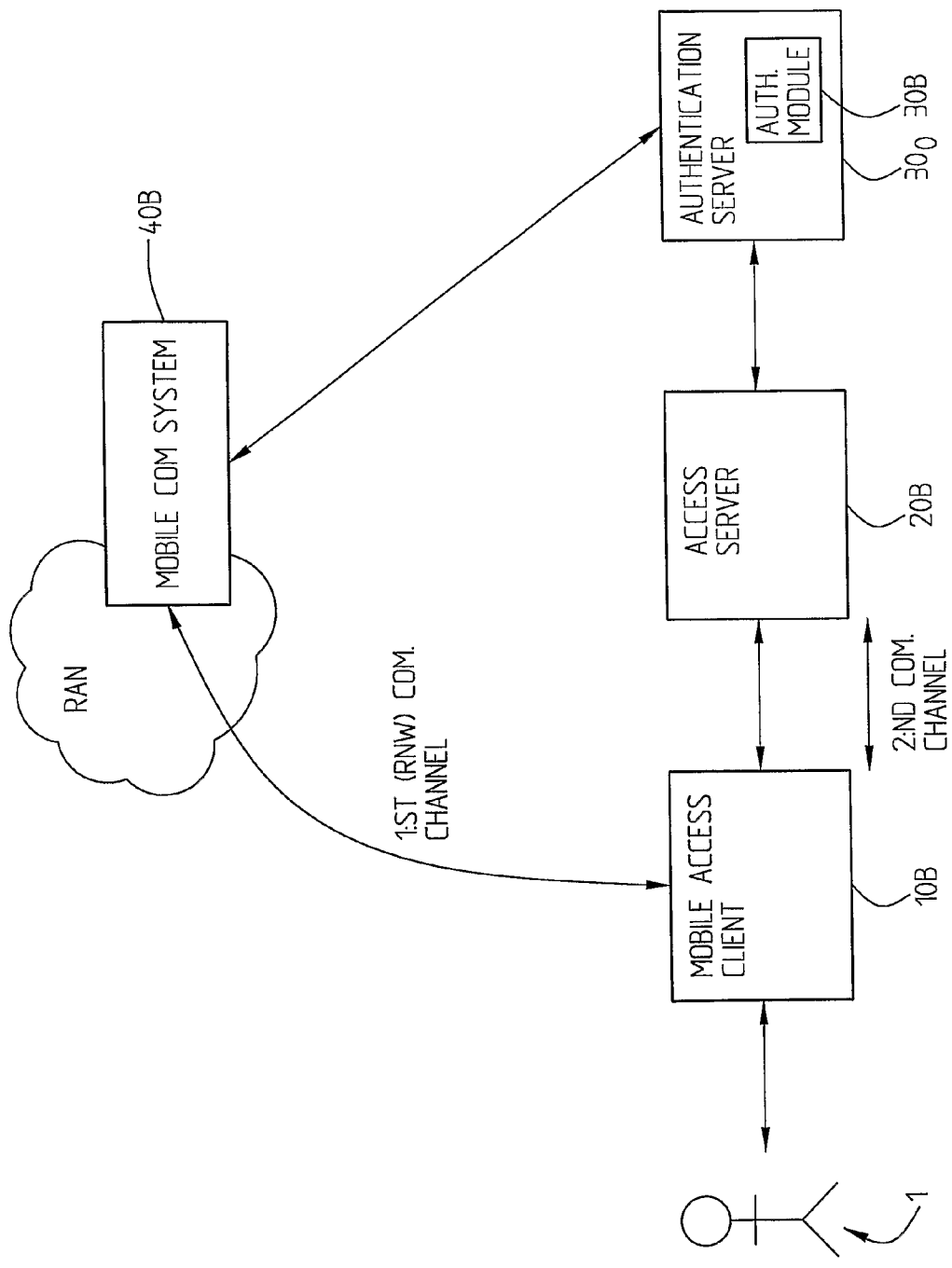

FIG. 3 is still another block diagram showing the implementation of a system according to the invention. In this implementation it is supposed that the user station arrangement 10B comprises one single unit, the mobile access client. It is supposed to communicate with the mobile communication system 40B over a first radio network communication channel and with the access server 20B over a second communication channel. The access server 20B in turn communicates with an authentication server 30$_0$ for example of a conventional type which comprises an authentication module 30B for performing the inventive concept. The authentication module 30B may also be provided as a separate unit in communication with the authentication server 30$_0$. It should be clear that the user station arrangement 10B may of course consist of two separate units, one mobile device and an access terminal, with an authentication means as described here.

The authentication server can thus be implemented as a stand-alone authentication server, which is the very general case, or as an authentication module for example in an access server, which is an application specific case.

Figure 4:
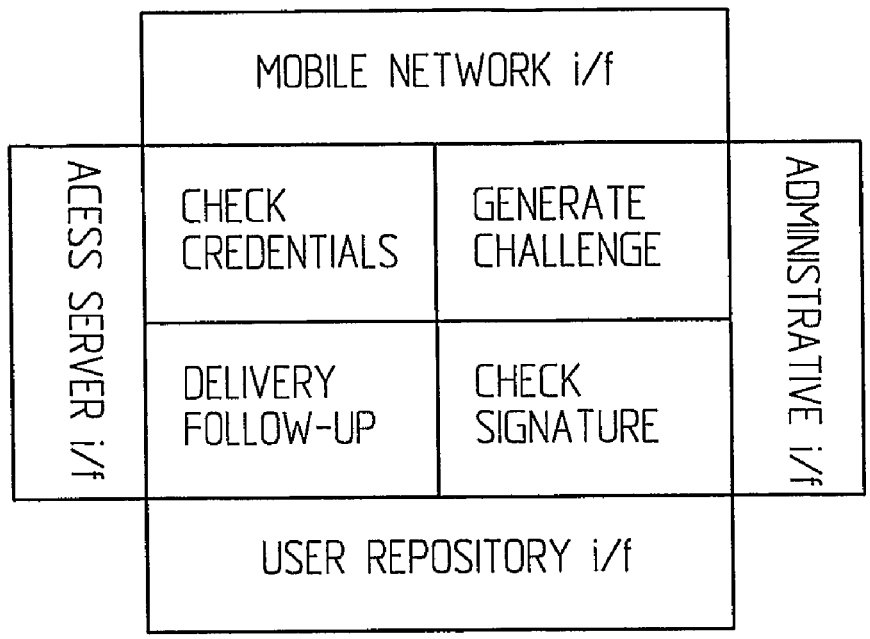

FIG. 4 is a conceptual diagram describing the main functions or components of an authentication server 301 that supports the inventive concept. It is supposed that the authentication server 30' comprises one or more access server interface modules by which access servers can be interfaced. One example of such an interface is the RADIUS protocol in which case the authentication server access acts as a RADIUS server (RFC Request For Comments 2865) sections 2.1 and 4.4, and the access server acts as a RADIUS client. RADIUS as specified in RFC 2865 is a commonly user protocol for interfacing an authentication server with an access server. To support an authentication scheme whereby the end user is presented with a challenge prompt as a response to an access request, the challenge-response mechanism in RADIUS can be used. RADIUS challenge-response is described in the above mentioned sections of RFC 2865. The inventive concept is not limited to support of RADIUS challenge-response mechanism, but is has to support a similar mechanism.

The authentication means is also supposed to comprise one or more mobile network interface modules by which one or more mobile networks are interfaced. One example of such an interface is an SMSC (Short Message Service Center) external interface protocol, such as SMPP, by which mobile devices can be reached via SMS. The interfacing to mobile networks can also be handled in a separate gateway node (not shown), in which case the authentication server only needs to support the interface to this gateway node.

Still further it is supposed to comprise one or more user data storing means interface modules by which one or several user data storing means or repositories can be interfaced. Necessary user information for example includes the phone number and the public keys corresponding to the mobile devices of the concerned end users. This data can be stored in a dedicated database or in an LDAP (Lightweight Directory Access Protocol) catalogue.

The authentication server means 30' also comprises an administrative interface for operation, administration and maintenance of the server, in a conventional manner. Still further the authentication server means 30' comprises what in the present conceptual block diagram can be denoted a server core which comprises the core authentication functions of the server. These functions comprise a function for retrieving user credentials from the user repository and checking them against the credentials provided by the end users, and a function for generating a challenge code (preferably a random challenge code) (and prompt) which is to be signed by the secret or private key stored in the identity module of the mobile device. Still further it comprises a function for follow-up of the delivery status of the challenge code delivered to the mobile device via the mobile network, i.e. over the first communication channel, and in case the delivery is not successful and verified, present the challenge code via the second communication channel or via the access channel instead and instruct the end user to manually sign the challenge with the mobile device. Finally it comprises a function for checking that the signed access challenge returned by the end user is correct, e.g. compare it with the original challenge code to see if there is correspondence between them and hence either grant or reject the request for access to the protected information.

In order to support the inventive concept, the mobile device and the corresponding identity module, for example a SIM card, has to support the functionality of receiving a challenge code via the mobile network, for example as a short message, sign the challenge code with the secret or private key stored on the identity module, for example the SIM card, and present the signed challenge code on the display of the mobile device. As an option the end user can be requested to enter a secret PIN or similar before the signed challenge code is presented to the user. Manual input of a challenge code via the keypad or for example via voice actuation control means of the mobile device is here to be supported. The user then for example selects the signature function from a menu and is prompted to enter the challenge code to be signed. As an option the user may also be requested to enter a secret PIN before the signed challenge code is presented to the user. As referred to earlier in the application, some of these functions may also be, at least to some extent, automated.

Figure 5:
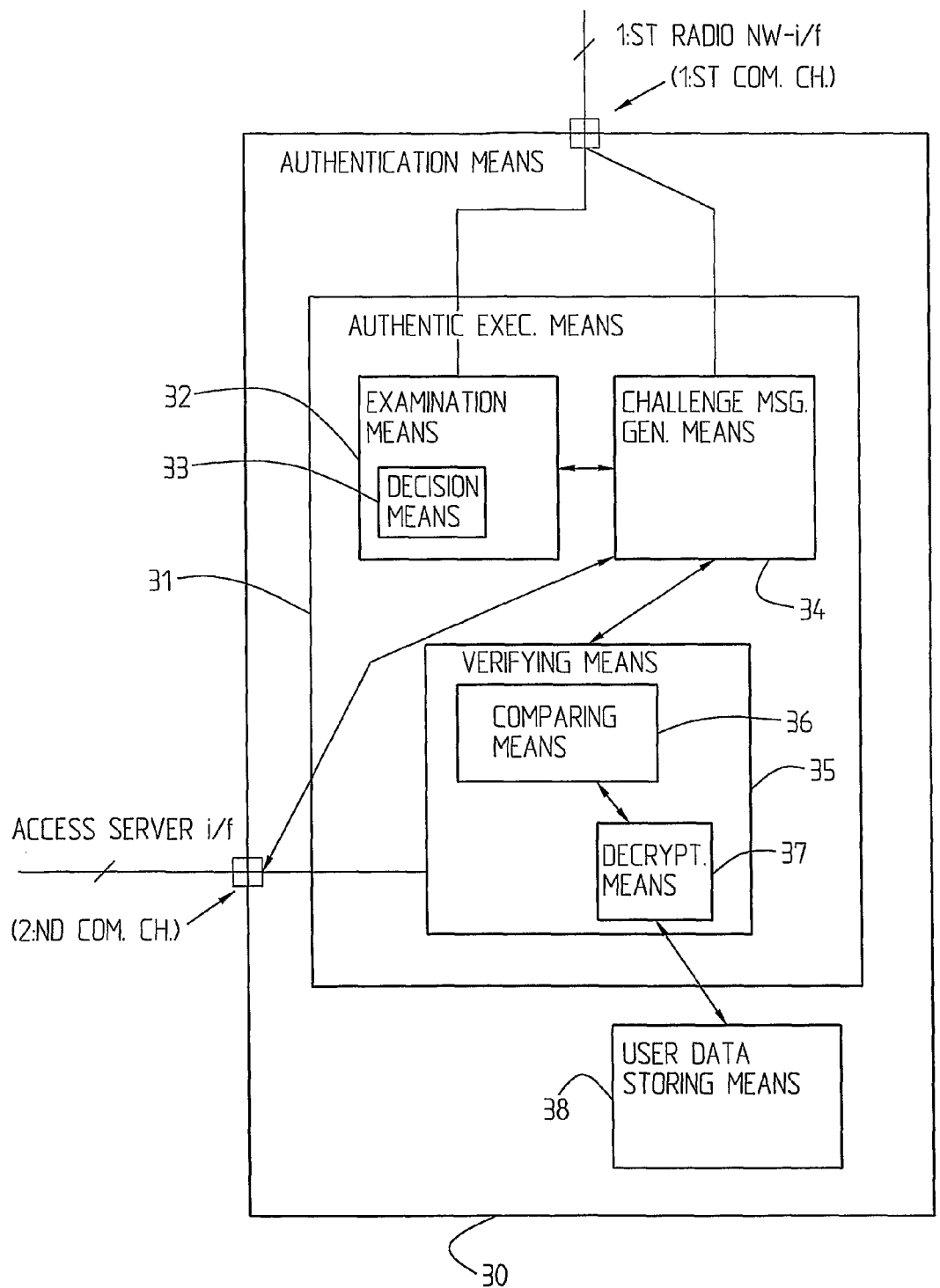
FIG. 5 shows one simplified embodiment of an authentication means according to the invention.

FIG. 5 is a schematical block diagram describing one embodiment of an authentication means 30 in which those functions or means that are particularly relevant for carrying out the inventive concept are shown. The authentication means 30 here comprises a first radio network interface for a first communication channel and an access server interface for the second communication channel, or the access channel. The authentication server comprises an authentication execution means 31 comprising an examination means 32 for sending a first challenge message comprising a challenge code generated by challenge message generating means 34 on the first communication channel to establish if the first authentication mode can be used. The examination means 32 comprises the decision means 33 for establishing if a delivery confirmation or delivery receipt is received from the user end station arrangement confirming the availability over the radio network or over the first communication channel, i.e. checking if the challenge code has been appropriately received by the user station arrangement, and for deciding whether the first authentication mode or the second authentication mode is to be used.

The challenge message generating means 34, if a confirmation is correctly received, i.e. confirming availability of a radio network, generates a second challenge message, a challenge prompt, which is sent over the access channel, i.e. if the first authentication mode can be implemented. (The prompt may also be directly provided by the examination means 32).

Alternatively if the second authentication mode is to be implemented, a message requesting cancel of the preceding challenge code, if required, is sent. A combined challenge message comprising a challenge code and a challenge prompt is generated by the challenge generating means 34 which sends it over the second communication channel to the access client. An encrypted or signed challenge code is received in the verifying means 35 where it is to be compared with the sent out challenge code in comparing means 36 after decryption in the decrypting means 37 fetching a public key concerning the user station arrangement stored in user data storing means 38. If the decrypted challenge code corresponds to the originally generated challenge code (or an expected response), access can be granted, otherwise it is rejected.

The procedure in the verifying means 35 takes place irrespectively of whether the first authentication mode or if the second authentication mode is implemented. It should be clear that the user data storing means 38 can be provided as a dedicated storing means in the authentication server or as a part of already existing user data storing means or conventional user data storing means provided in an authentication server or as a separate storing means externally of the authentication server. It can be of any appropriate kind, dedicated for carrying out the specific invention or comprise conventional storing means holding the relevant user data.

Figure 6:
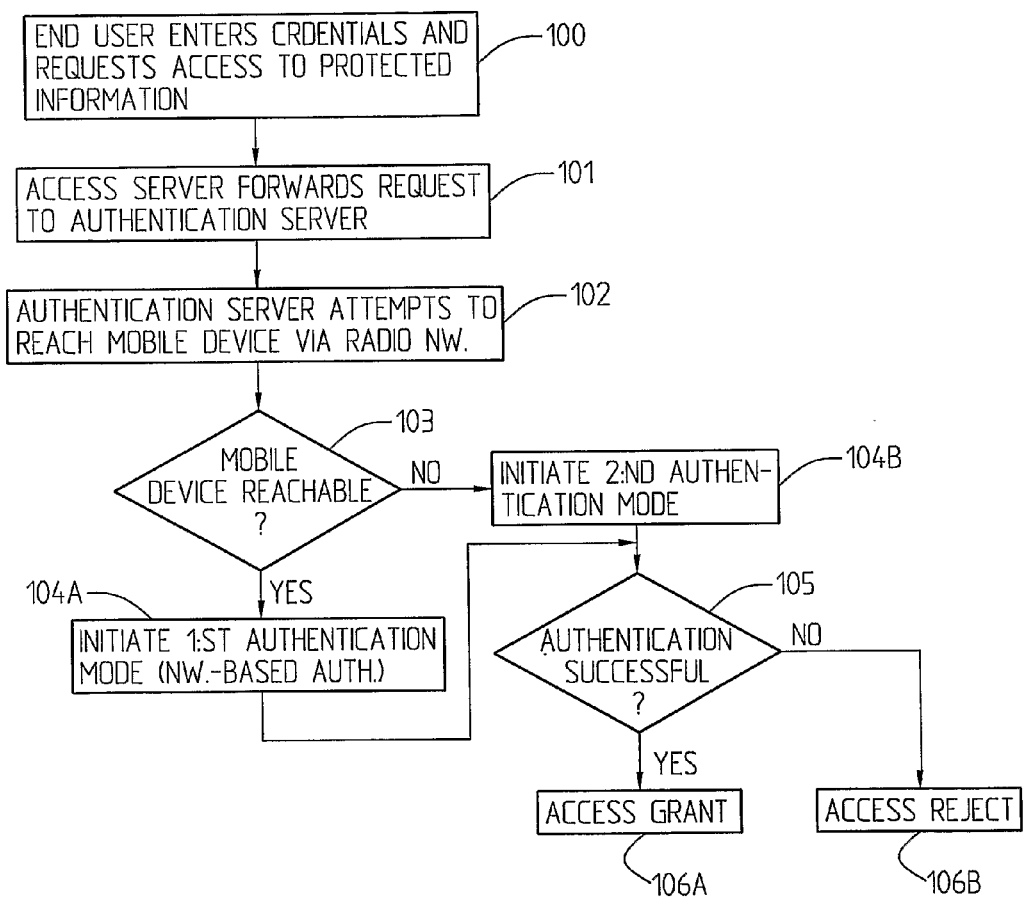
FIG. 6 is a flow diagram schematically describing the inventive procedure.

FIG. 6 is a very schematical flow diagram describing the inventive concept. It is here supposed that the processing is started when an end user requests access to protected information or a protected service or resource by entering user credentials, 100, on an access terminal. User credentials typically comprise a user identity, sometimes together with a user password. This corresponds to a normal procedure for access requests. The access request first is provided to the access server which forwards the request to an authentication server, 101. The authentication server attempts to reach the mobile device via the radio network, 102, in order to initiate a network based authentication dialogue, 102, i.e. to establish if it is possible to implement the first authentication mode. What is essential is that the authentication server verifies that the mobile device is reachable, 103, via the radio network for example by requesting, and waiting for, a delivery receipt for a message, for example a challenge code, sent to the mobile device, 103. It should be clear that this verifying step also can be performed in other ways. If it can be verified that the mobile device is reachable, the first authentication mode, i.e. the network based authentication procedure, is initiated, 104A. This can be implemented in various ways as will be more thoroughly described below.

If, on the other hand, the mobile device is not reachable, e.g. no delivery receipt is returned within a preset time period, e.g. until an established timer expires, the authentication server instead proceeds to initiate a second authentication mode, particularly an authentication dialogue requiring manual input, 104B. This may also be implemented in various ways as will be discussed below. Irrespectively of which authentication mode or authentication dialogue that is implemented, the authentication server will determine if the authentication was successful, 105, for example by comparing a sent out challenge code by a returned and signed challenge code (after decryption), and if the authentication was successful, access is granted, 106A, otherwise access is rejected, 106B.

Figure 7:
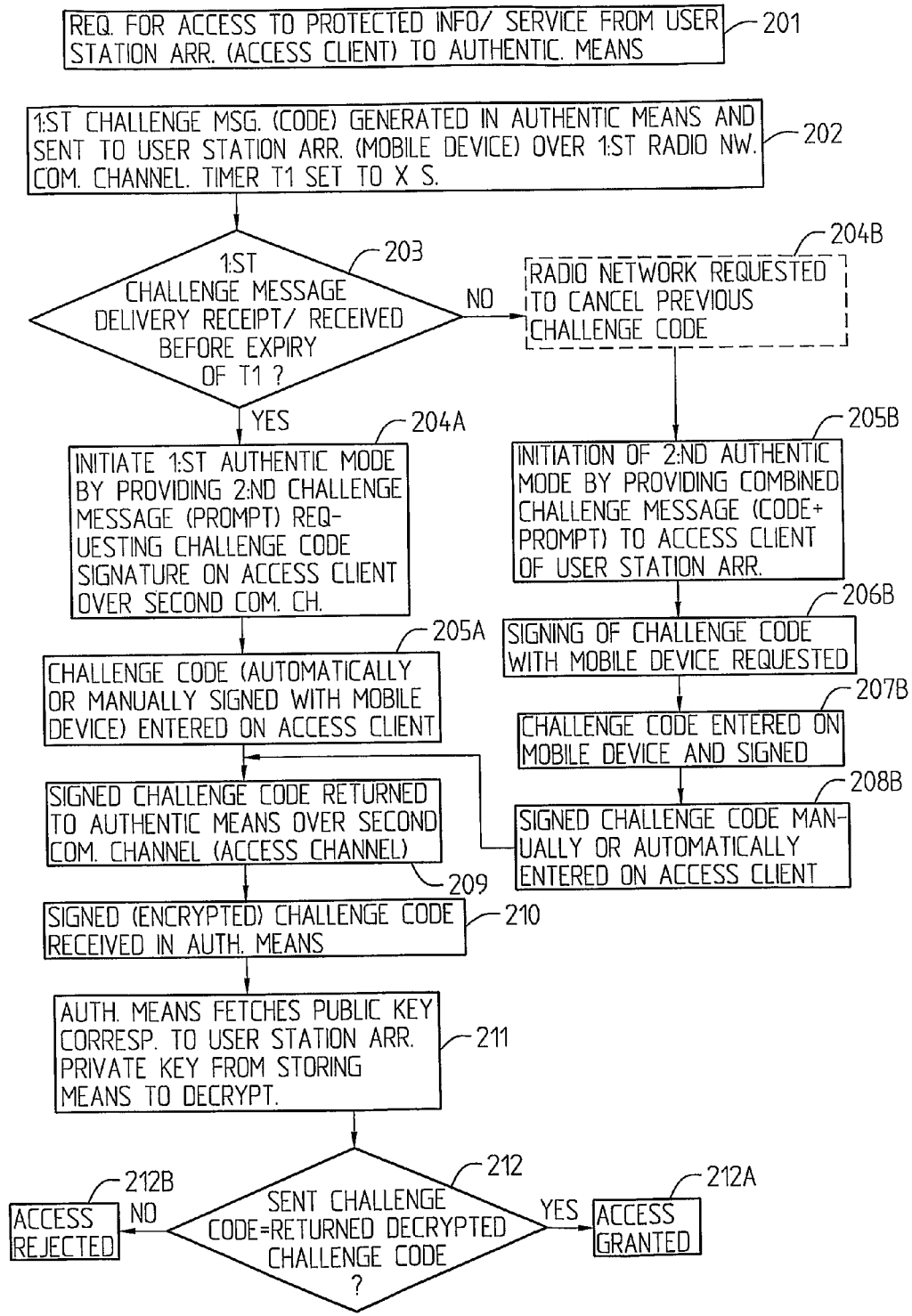
FIG. 7 shows a flow diagram describing the inventive concept according to one implementation in some more detail.

FIG. 7 is a somewhat more detailed flow diagram describing one implementation of the inventive concept. It is supposed that a request for access to a protected service or protected information in general is provided from a user station arrangement, particularly the access client, to an authentication means, 201. For examination purposes, i.e. to verify if availability is provided over the radio network, a first challenge message comprising a challenge code is generated in the authentication means and sent to the user station arrangement, particularly the mobile device, over the first radio network communication channel, or over the first communication channel, 202. Particularly a timer T1 is also set to x seconds. Then it is examined if a delivery receipt concerning the first challenge message is received in the authentication means before T1 expires, 203. (Already at this stage the challenge code may be signed automatically or manually with the mobile device.) If yes, a first authentication mode is initiated by providing a second challenge message, a challenge prompt, requesting an entry of the challenge code signature on the access client which prompt is sent over the second communication channel, 204A. The challenge code automatically or manually signed with the private key on the mobile device, is then, e.g. manually entered on the access client, 205A. Subsequently the signed challenge code is returned from the access client to the authentication means over the second communication channel, also denoted the access channel, 209. The signed or encrypted challenge code is then received in the authentication means, 210, and the authentication means fetches a public key corresponding to the user station arrangement private key from storing means to decrypt the signed challenge code, 211. Thereafter it is verified if the sent challenge code corresponds to the returned, decrypted challenge code, 212. If yes, access is granted, 212A, if not, the access is rejected, 212B.

If however, in step 203 above, no delivery receipt was received timely, the authentication means sends a cancel request to the mobile network (e.g. SMS-C) to cancel the previously sent challenge code, 204B. This is illustrated with dashed lines since for example there may be nothing to cancel, for example the challenge never reached the user station arrangement, but conveniently the request has to be sent out anyhow. Subsequently it is proceeded to initiation of the second authentication mode by generating a combined challenge message comprising a challenge code and a challenge prompt and sending it over the access channel to the access terminal (client) of the user station arrangement, 205B. Signing of the challenge code with the mobile device is requested, 206B. Particularly the end user manually enters the challenge code on the mobile device and signs it, 207B. Subsequently the signed challenge is manually (or automatically) entered on the access terminal (client), 208B, and it is proceeded step 209 etc. as for the first authentication mode.

In one embodiment, it is supposed that, in a pre-authentication mode, the end user is requested to enter user credentials (not shown in the figure). If the credentials are correct, the authentication server generates a random challenge code which is sent via the mobile network to the mobile device. The challenge is encrypted with the secret key stored on the security module of the mobile device and the hence signed challenge code is presented on the display of the mobile device. As an option the user can be requested to enter a PIN before a signed challenge is displayed. If the challenge code has been successfully delivered to a mobile device, the first module is used and the authentication server proceeds to present a challenge prompt to the end user, via the access server, requesting the end user to enter the signed challenge on the access client. If the correct challenge code has been returned, which, as referred to above, is verified by means of decrypting it with the public key corresponding to the private or secret key on the mobile device, access can be granted.

If on the other hand the authentication server somehow is informed that the challenge code cannot be delivered to the mobile device, i.e. no confirmation is received within the predetermined time period, the authentication server proceeds to present a challenge code and challenge prompt to the end user via the access server. This is also denoted the combined challenge message containing the random challenge code together with a prompt comprising a request to sign the random challenge code with the mobile device and then to enter it on the access client (terminal). The user may then particularly select the signature function on the menu of the mobile device, and enter the challenge code. The challenge code has then to be encrypted with the secret or private key stored on the security module of the mobile device, and the signed challenge is presented on the display of the mobile device. As an option the user can be requested to enter a PIN before the signed challenge code is displayed. Then the user then enters the signed challenge code on the access terminal and it is returned to the authentication server. If the correct challenge code has been returned, which is verified by means of decrypting it with public keys as discussed above, access is granted.

It should be clear that this concerns one particular implementation. A similar implementation will be further described with reference to the signalling diagram of FIG. 8 with the indication of alternative implementations in association therewith.

Figure 8:
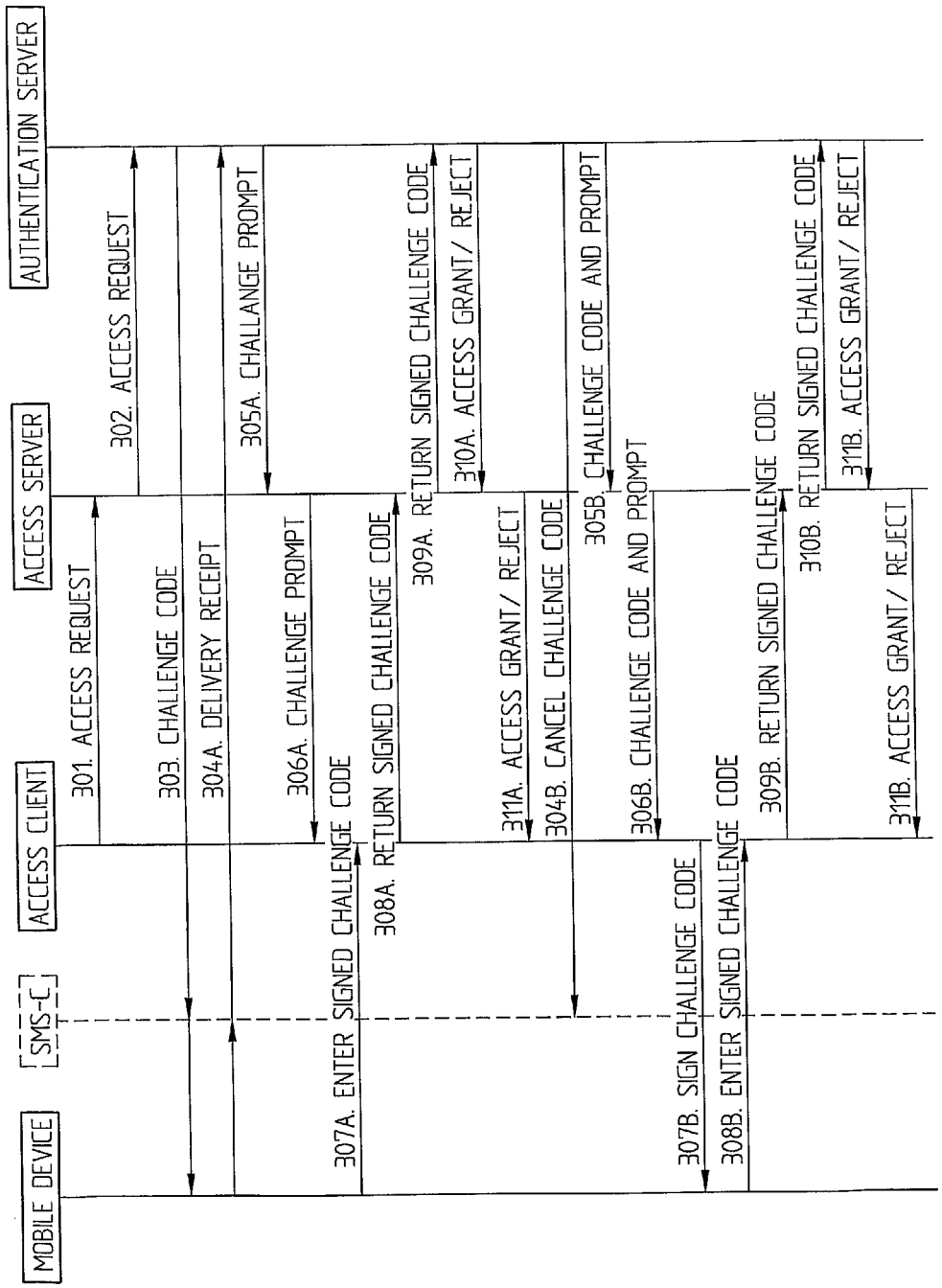
FIG. 8 is a sequence diagram describing the messaging according to one implementation of the inventive concept.

FIG. 8 is a signalling diagram describing one implementation of the inventive concept. First it is supposed that an initial access request which contains user credentials is sent from the access client to the access server, 301. It is forwarded from the access server to the authentication server, 302, for example using the RADIUS protocol. Based on the received user credentials, the authentication server checks if the mobile device is registered for the user in question, for example by consulting an internal database or by consulting some external trusted source, for example an LDAP directory. The reference to the mobile device can typically be the end user mobile phone number. In an alternative implementation, the end user can enter the reference to the mobile device, for example the phone number, directly as a user name in which case the authentication server will not need to consult any internal or external data storing means for this reference.

The authentication server then generates a random challenge code and sends it via the mobile telephony system or some other similar radio communication network, to the mobile device or the end user particularly together with the message to activate first a pre-authentication dialogue on the mobile device, 303. In one implementation this initial message, also noted pre-authentication procedure, comprises a short message or an SMS that initiates a SIM Toolkit dialogue on the end user's mobile device. The authentication server then proceeds to wait for a confirmation, for example by setting a timer, from the network within a predetermined time period that the challenge code has been successfully delivered to the mobile device, 304A, also denoted a delivery receipt. In one implementation this can be in the form of a delivery receipt that the SMS has been delivered to the mobile device. Once delivered to the mobile device, the initial message or the first challenge message e.g. comprising a challenge code, may trigger the authentication dialogue. In one implementation this can be done by prompting the end user to enter a secret PIN on the phone (if this not already has been done automatically), and if the correct PIN is entered, sign the challenge code with a private secret key stored on the SIM card (or equivalent identity module) and present the result, i.e. the signed challenge on the display of the mobile device. In an alternative implementation the user does not need to enter any PIN, but the challenge is automatically signed with the private key and presented on the display of the mobile device.

Once the authentication server has received a confirmation or a delivery receipt from the network that the mobile device has been reached, it requests the access server to present a second challenge message comprising as a challenge prompt, 305A, to the end user. In one implementation this is in the form of a RADIUS access challenge message. The access server forwards this request to the access client, 306A, i.e. the challenge prompt, where the end user is prompted to enter the signed challenge, 307A, that is presented on the display of the mobile device, on the access terminal (client).

The signed challenge is then returned via the access channel to the access server, 308A, and further forwarded to the authentication server, 309A. The authentication server then decrypts the signed challenge code with the public key corresponding to the private key stored on the authentication module of the mobile device. The public key is either stored in an internal database of the authentication server, or requested from an external source, for example via an LDAP query. The authentication server then compares the returned, and decrypted challenge code with the original challenge code sent to the mobile device. If the two challenge codes match, the authentication server responds with an access grant message/310A, to the access server, which in turn grants access, 311A, to the access client. If on the other hand an incorrect challenge code has been returned, the authentication server instead responds with an access reject, 310A, 311A.

If no delivery receipt, 304A, was returned within a predetermined time period, the authentication server proceeds with the second authentication mode.

The authentication server first clears the radio network from pending access challenge codes, for example by sending a cancel message to the network, 304B. It then sends a challenge code and prompt to the access server, with instructions to the end user that the code should be (manually) signed with the mobile device. In one implementation this can be done as a RADIUS challenge code message. The access server thus forwards the combined challenge to the access client, 306B, which prompts the end user to sign the challenge with the mobile device and return the signed challenge code. The end user reads the challenge code on the access client and manually selects the signature function on the mobile device. The mobile device then requests the end user to enter the challenge code, 307B, and optionally, a private PIN. The challenge is then signed with the private key stored on the security module of the mobile device. The resulting signed challenge is presented on the display of the mobile device, and (manually) entered by the end user on the access client, 308B. This signed code is returned, 309B, 310B, to the authentication server, which verifies the challenge in the same way as described above with reference to messages 308A-311A above.

In alternative implementations some or all of the manual steps described with reference to FIG. 8, for example 307A, 307B, 308B can be automated by connecting the access client with the mobile device, for example by using the Bluetooth radio protocol. The steps can also be automated in cases when the access client and the mobile device is one and the same unit.

It should be clear that between the mobile device and the authentication server a network node is included, for example an SMS-C (illustrated with the dashed lines the figure).

It should be clear that the concept as described in this application also is applicable to implementations wherein symmetric keys are used instead of asymmetric keys. In that case the keys referred to as public as actually also secret.

Still further, the security module may alternatively be implemented as software in the mobile device hardware as an alternative to SIM-cards or similar.

It should also be clear that the invention in many other aspects can be varied in a number of ways within the scope of the appended claims and it is not limited to the specifically illustrated embodiments.

The invention claimed is:

1. A system for authenticating an end user of a user station arrangement requesting access to protected information, comprising:
   an access server and an authentication device, the user station arrangement supporting communication with the authentication device over a first communication channel of a radio network,
   wherein the user station arrangement further supports communication with the authentication device over a second communication channel;
   the authentication device is adapted to, at reception of a request for access to protected information from a user station arrangement, establish if the user station arrangement is reachable over the first communication channel;
   the authentication device is adapted to support a first authentication mode and a second authentication mode over the second communication channel; and
   the authentication device comprises a decision device configured to select which of the first and second authentication modes is to be used for a user station arrangement requesting access to protected information;
   wherein the user station arrangement comprises a mobile device and an access terminal; the first authentication mode has priority over the second authentication mode; the authentication device includes an examination device that includes the decision device and that is configured to establish if the mobile device is reachable over the first communication channel of the radio network; and the decision device is configured to use the second mode if the mobile device is not reachable over the first communication channel of the radio network.

2. The system of claim 1, wherein the decision device comprises or communicates with a switch configured to switch between the first and second authentication modes.

3. The system of claim 1, wherein at least one of the first communication channel comprises an authentication channel and the second communication channel comprises an access channel.

4. The system of claim 1, wherein the second communication channel is a communication channel of either the radio network or a second radio network.

5. The system of claim 1, wherein the second communication channel is a communication channel of a fixed communication network.

6. The system of claim 1, wherein the authentication device comprises an authentication module in communication with at least one of the access server and an authentication server.

7. The system of claim 1, wherein the authentication device comprises an authentication server.

8. The system of claim 1, wherein the authentication device comprises an authentication executing device that includes the examination device and is adapted to initiate a pre-authentication dialogue with the mobile device over the first communication channel to establish if the first authentication mode can be used.

9. The system of claim 8, wherein the authentication device is adapted to generate and transmit, in initiating the pre-authentication dialogue, a first challenge message comprising a random challenge code to the mobile device over the first communication network;
   to initiate, if delivery of the challenge code is verified, a first authentication dialogue of the first authentication mode by providing a second challenge message comprising a challenge prompt to the mobile device;
   to initiate, if delivery of the challenge code is not verified, a second authentication dialogue of the second authentication mode by generating and sending a combined challenge message comprising a challenge code and a challenge prompt over the second communication channel to the user station arrangement; and
   to examine, for the first or second authentication dialogue, if the challenge code is returned appropriately signed or not for granting or rejecting access to the protected information using the first or second authentication mode.

10. The system of claim 9, wherein the examination device is adapted to send the first challenge message as a Short Message Service message.

11. The system of claim 9, wherein the authentication device communicates with a user data store holding user information and an authentication verification device adapted to decrypt the signed challenge code using a public key of a user station arrangement corresponding to a private key stored in an authentication module of the user station arrangement, to compare the returned decrypted challenge code with the original challenge code sent to the user station arrangement, to grant the access request if the original challenge code corresponds to an expected response code, and to reject the access request otherwise.

12. The system of claim 9, wherein the user station arrangement comprises a mobile device and an access terminal, the second challenge message is adapted to request signing of the challenge code provided in the first challenge message with the mobile device and entry of the signed challenge code on the access terminal, and the combined challenge message is adapted to request signing of the accompanying challenge code on the mobile device and entry of the signed challenge code on the access terminal.

13. An authentication device for authenticating an end user requesting access to protected information from a user station arrangement, comprising:
   an access serving device interface and at least one interface enabling communication with a mobile device of the user station arrangement over a first communication channel of a radio network, the at least one interface also being adapted to support communication with the user station arrangement over a second communication channel; and
   an authentication execution device comprising an examination device for establishing if mobile device of the user station arrangement is reachable over the first communication channel;
   wherein the authentication device is adapted to support a first authentication mode and a second authentication mode using the second communication channel, and the examination device comprises a decision device for selecting the first or the second authentication mode, and the first authentication mode has priority over the second authentication mode, and the second mode is used only if the mobile device of the user station arrangement is not reachable for authentication over the first communication channel, and the authentication device is configured to use the second authentication mode if the mobile device of the user station arrangement is not reachable over the first communication channel.

14. The authentication device of claim 13, wherein the decision device communicates with a switching device configured to switch between the first and the second authentication mode.

15. The authentication device of claim 13, wherein the first communication channel comprises an authentication channel, and the second communication channel comprises an access channel.

16. The authentication device of claim 13, further comprising an authentication server.

17. The authentication device of claim 13, further comprising an authentication module adapted to communicate with an authentication server or an access server.

18. The authentication device of claim 13, wherein the examination device is adapted to examine if a given criterion is fulfilled to establish if the mobile device of the user station arrangement is reachable over the first communication channel by sending a first challenge message comprising a challenge code over the first communication channel, and to examine if a direct or indirect delivery confirmation is obtained relating to the availability of the mobile device of the user station arrangement for authentication purposes.

19. The authentication device of claim 18, wherein if the given criterion is fulfilled, the examination device is adapted to activate the authentication execution device in the first mode in which they are adapted to generate and send a second challenge message comprising a challenge prompt prompting manual or automatic entry of the challenge code signed with the mobile device in the access client and returning of the signed challenge code, and the authentication execution device further comprises verifying means for decrypting the signed challenge code, comparing the returned decrypted challenge code with an expected response code, granting the access request if there is agreement between the original challenge code or expected response code and the decrypted returned challenge code, and rejecting the access request if there is no agreement.

20. The authentication device of claim 19, wherein the verifying means is adapted to fetch, for the first and second modes, an externally stored public key corresponding to a private key of the user station arrangement used for signing.

21. A method of authenticating a remote end user of a user station arrangement requesting access to protected information by sending an access request to an authentication device, comprising:
   determining, by the authentication device, whether a mobile device of the user station arrangement is reachable for authentication over a first communication channel of a radio network;
   if the mobile device of the user station arrangement is determined as reachable, using a first authentication mode over the first communication channel of the radio network; and
   if the mobile device of the user station arrangement is determined as not reachable, using a second authentication mode over a second communication channel;
   wherein the first authentication mode has priority over the second authentication mode; and the user station arrangement further includes an access terminal.

22. The method of claim 21, wherein determining comprises:
   generating a first challenge message comprising a challenge code;
   sending the first challenge message to the mobile device of the user station arrangement or a radio network node handling the mobile device of the user station arrangement;
   determining, by the authentication device, whether a given criterion is fulfilled;
   if the given criterion is determined as fulfilled, using or initiating the first authentication mode by sending a second challenge message comprising a challenge prompt requesting the challenge code signed with the user station arrangement and return thereof to the authentication device over the second communication channel; and
   if the given criterion is determined as not fulfilled, initiating the second authentication mode, the second authentication mode comprising sending a combined challenge message that includes a challenge code and a challenge prompt requiring the challenge code to be signed at the user station arrangement.

23. The method of claim 21, wherein the first and second authentication modes comprise performing, in the authentication device:
   receiving a returned encrypted signed challenge code;
   decrypting the returned encrypted challenge code;
   comparing the original, sent challenge code or an expected code with the returned, decrypted challenge code; and
   granting the access request if the returned decrypted challenge code corresponds to the original, sent challenge code or the expected response code, and otherwise rejecting the access request; and
   performing, at the user station arrangement:
   sending a delivery confirmation to a confirmation device;
   in the first authentication mode:
   automatically signing the challenge code with the mobile device of the user station arrangement communicating with the authentication device over the first communication channel;
   at reception of the second challenge message:
   entering the signed challenge code on the user station arrangement communicating with the authentication device over the second communication channel.

* * * * *